April 15, 1941.  B. DICK  2,238,254
MOUNTING MEANS FOR BRAKE SHOES
Filed March 29, 1940  2 Sheets-Sheet 2
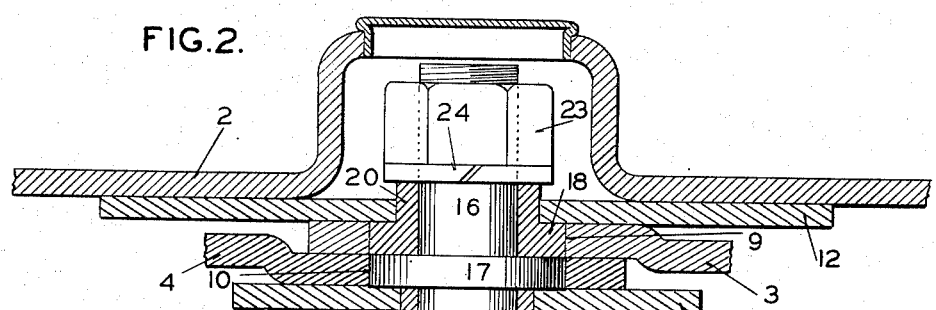
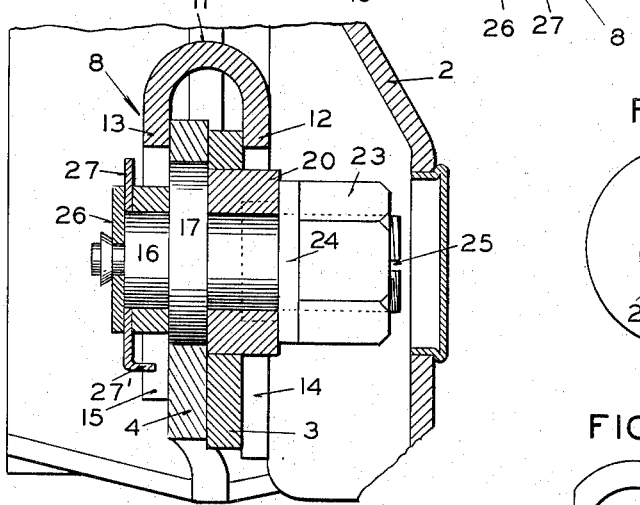
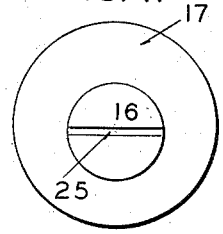
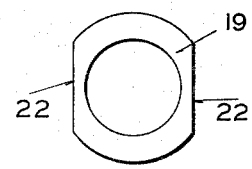
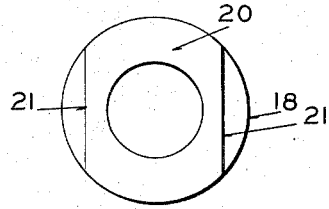
INVENTOR
BURNS DICK
BY
ATTORNEY Patented Apr. 15, 1941

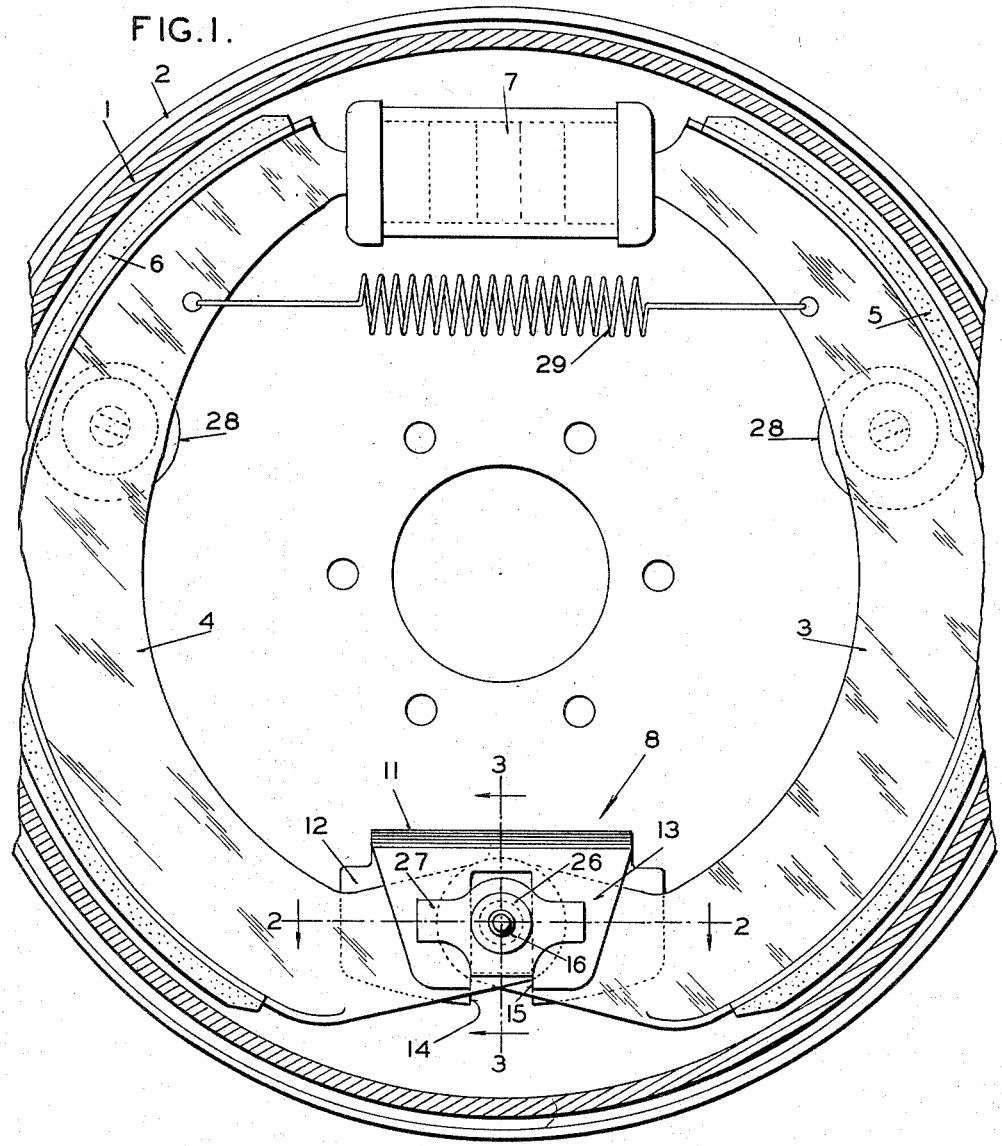

2,238,254

UNITED STATES PATENT OFFICE 2,238,254

MOUNTING MEANS FOR BRAKE SHOES

Burns Dick, Ferguson, Mo., assignor to Wagner Electric Corporation, St. Louis, Mo., a corporation of Delaware Application March 29, 1940, Serial No. 326,544

14 Claims. (Cl. 188—78)

My invention relates to braking apparatus and more particularly to mounting means for two brake shoes.

One of the objects of my invention is to provide in a brake embodying two pivotally connected brake shoes, means for anchoring the pivoted ends of the shoes against circumferential movement without restraining their movement toward the drum during braking action and additional means for adjusting the said ends of the shoes relatively to each other.

Another object of my invention is to provide pivotally connected brake shoes with anchor means and adjustable means of the type described which will be of simple and compact construction, be economical to manufacture and be easy to adjust.

Other objects of my invention will become apparent from the following description taken in connection with the accompanying drawings in which Figure 1 is a broken view partly in section of a brake assembly embodying my invention, Figures 2 and 3 are sectional views taken on the lines 2—2 and 3—3 respectively of Figure 1 showing assembly details and Figures 4, 5, and 6 are views of parts of the construction.

Referring to the drawings in detail the numeral 1 indicates a brake drum secured to a rotating member such as a vehicle wheel and 2 a support or backing plate enclosing the open side of the drum and secured to a fixed member as is the usual practice. Within the drum are two brake shoes 3 and 4 provided respectively with linings 5 and 6 for cooperation with the drum. The upper ends of the shoes are shown as being actuated by a double piston fluid motor 7 connected to a suitable source of pressure such as a master cylinder device (not shown).

The lower ends of the shoes are pivotally connected together and mounted on the backing plate by my novel anchoring and adjusting mechanism, generally indicated by the numeral 8, which will permit the shoe ends to be adjusted relative to each other but not interfere with their simultaneous movement in a direction toward the drum during braking action. As shown, the lower ends of the shoes 3 and 4 overlap each other and are provided respectively with circular bearing openings 9 and 10. The backing plate adjacent the shoe ends has secured thereto, as by welding, an anchor member 11 which is U-shaped, and receives the ends of the shoes between its downwardly extending leg portions 12 and 13 which are provided respectively with parallel slots 14 and 15. These slots open at their lower ends and extend in a radial direction with respect to the drum.

The openings 9 and 10 in the ends of the shoes receive a round bolt or pivot pin 16 having an integral eccentric bearing portion 17 of the same diameter as bearing opening 10 and upon which the shoe 4 is adapted to pivot. On opposite sides of this eccentric portion are positioned sleeves 18 and 19. The inner and outer surfaces of the former sleeve are concentric and their axes coincide with the axis of the bolt. The sleeve 18 is received in the opening 9 in the end of shoe 3 and acts as a bearing upon which the shoe pivots. The sleeve 18 is also provided with an integral extension 20 projecting into slot 14 of leg 12 and has flat surfaces 21 for cooperating with the side of said slot.

The other sleeve 19 on the bolt is positioned in slot 15 of leg 13 and has flat surfaces 22 for cooperating with the sides of said slot. It is thus seen that the bolt by means of the two sleeve constructions is permitted to be moved in the slot to thereby allow the shoes to move toward the drum. The slot, however, restrains the shoes from movement circumferentially of the drum, thus providing anchor means. Since the sleeves 18 and 19 are held from rotation the bolt can be turned relative thereto and by means of the eccentric portion 17 the ends of the shoes adjusted with respect to each other.

In order to clamp the sleeve 18 to the bolt a nut 23 and lock washer 24 are provided, this not, however, interfering with the movement of the sleeves and bolt in the slots. The bolt has a slot 25 in its end for receiving a suitable tool to turn it. The sleeve 19 is held on the bolt by a washer 26. Positioned on the end of the bolt between the sleeve and the washer is a leaf spring member 27 which engages the outer surface of leg 13 and applies an axial force to the bolt to thus hold the side wall of the eccentric portion 17 in tight frictional engagement with the inner surface of the leg. The friction created is sufficient to hold the bolt and shoe ends in a given position but not sufficient to prevent the shoes from being moved outwardly toward the drum by forces effective on the shoes during braking action and as the linings wear. The leaf spring is prevented from turning with the bolt by having a portion 27' extending into the slot 15.

In operation the shoes are mounted and connected as shown. When the shoes are disengaged from the drum they are held against the stop 28 by the retractile spring 29. The bolt 16 is so adjusted that the lining on both ends of the shoes are an equal distance from the drum. If one should be a greater distance than the other all that is necessary to correct this is to turn the bolt in the proper direction and cause the end of shoe 4 to be moved up or down, as the case may be, with respect the end of shoe 3.

When the brake is applied the fluid motor will force the shoes into engagement with the drum by pivotal movement on the eccentric portion 17 and the sleeve 18. The drag of the forward shoe on the drum will produce a force acting toward the drum which will cause the pivoted ends of the shoes to be simultaneously forced toward the drum to produce maximum braking, said force being great enough to overcome the friction created by the leaf spring. The pivoted ends of the shoes will be held from circumferential movement by the engagement of the sleeves 18 and 19 with the legs of the member 11. When the fluid motor is released the shoes will be moved away from the drum by pivotal movement about the eccentric portion 17 and the sleeve 18 under the action of retracting spring 29. The bolt will remain in the same position, being held there by the frictional force created by the leaf spring 27.

As the linings wear during the operation of the brake the pivotally connected ends of the shoes will be automatically adjusted toward the drum by a force effective during braking action. The new adjusted position will be maintained by the friction between the eccentric portion and the leg 13 caused by the leaf spring. If during the life of the brake it becomes necessary to adjust the ends of the shoes relatively to each other to maintain the clearance between the linings uniform, this can be done by rotating the bolt in a manner already described.

From the foregoing it is seen that I have produced a very simple and cheap mounting for the brake shoes which insures that they will be properly anchored, that they will be free to pivot about a single connecting pin and that the connected ends will be automatically adjusted as a unit toward the drum as the linings wear. Also the construction permits one shoe to be adjusted with respect to the other so as to have the linings of both shoes an equal distance from the drum. This is an important feature since it permits wider tolerances in manufacture. When no adjustment is provided for two pivotally connected shoes employing a single connecting pin it is necessary before mounting the shoes to be sure that both linings will properly engage the drums. If they do not a grinding operation is necessary. This operation is eliminated by my invention.

Being aware of the possibility of modification in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus provided with a support and with two shoes having overlapping ends, each of which has a bearing opening, a pin extending through the openings, two bearings carried by the pin and each cooperating with a shoe opening, one of said bearings having its axis eccentric to the axis of the pin, and means cooperating with the support for preventing rotation of the pin and the bearings carried thereby, said last named means not preventing relative movement between the support and pin in at least one direction.

2. In braking apparatus embodying two shoes having overlapping ends and each provided with a bearing opening, a support, a pin extending through the openings and having a portion rotatable therewith and cooperating with one of the openings to form a bearing for one of the shoes, a sleeve mounted on the pin and cooperating with the other opening to form a bearing for the other shoe, and means cooperating with the support for holding the sleeve from rotating.

3. In braking apparatus embodying two shoes having overlapping ends and each provided with a bearing opening, a support, a pin extending through the openings and having a portion rotatable therewith and cooperating with one of the openings to form a bearing for one of the shoes, a sleeve mounted on the pin and cooperating with the other opening to form a bearing for the other shoe, means cooperating with the support for holding the sleeve from rotating, and releasable means for securing the sleeve to the pin.

4. In braking apparatus, a support provided with a slot, a brake drum, two brake shoes for cooperation with the drum and having overlapping ends each of which has a bearing opening, a pin positioned in the slot and the openings, two bearings carried by the pin and each cooperating with a shoe opening, one of said bearings having its axis eccentric to the axis of the pin, and means cooperating with the slot for preventing rotation of the pin and the bearings carried thereby but not preventing movement of the pin in said slot.

5. In braking apparatus, a support provided with a slot, a brake drum, two brake shoes for cooperation with the drum having overlapping ends each of which is provided with a bearing opening, a pin extending through the slot and the openings, two bearings carried by the pin and each cooperating with an opening, one of said bearings being eccentric to the axis of the pin and rotatable therewith and the other concentric and mounted to permit relative rotation of the pin, and cooperating means between the slot and the last named bearing for preventing rotation thereof but not preventing movement of the pin in the slot.

6. In braking apparatus, a support provided with a slot, a brake drum, two brake shoes for cooperation with the drum having overlapping ends each of which is provided with a bearing opening, a pin extending through the slot and the openings, two bearings carried by the pin and each cooperating with an opening, one of said bearings being eccentric to the axis of the pin and rotatable therewith and the other concentric and mounted to permit relative rotation of the pin, an extension on the concentric bearing provided with flats cooperating with the slot for preventing rotation of the said bearing, and means for clamping said concentric bearing to the pin.

7. In braking apparatus, a support provided with a slot, a brake drum, two brake shoes for cooperation with the drum and having overlapping ends, each of which is provided with a bearing opening, a pin positioned in the slot and the openings, two bearings carried by the pin and each cooperating with a shoe opening, one of said bearings having its axis eccentric to the axis of the pin, means cooperating with the slot for preventing rotation of the pin and the bearings carried thereby but not preventing movement of the pin in said slot, and frictional means for resisting free movement of the pin in the slot.

8. In braking apparatus, a support provided with a slot, a brake drum, two brake shoes for cooperation with the drum and having overlapping ends, each of which is provided with a bearing opening, a pin positioned in the slot and the openings, two bearings carried by the pin and each cooperating with an opening, one of said bearings being eccentric to the axis of the pin and, rotatable therewith and the other concentric and mounted to permit relative rotation of the pin, cooperating means between the slot and the last named bearing for preventing rotation thereof but not preventing movement of the pin in the slot, and means for establishing a frictional resistance to movement of the pin in the slot.

9. In braking apparatus, a support provided with a slot, a brake drum, two brake shoes for cooperation with the drum and having overlapping ends, each of which has a bearing opening, a pin extending through the slot and the openings, two bearings carried by the pin and each cooperating with a shoe opening, one of said bearings having its axis eccentric to the axis of the pin, an element loosely mounted on said pin and positioned in the slot, cooperating means between the element and slot for preventing rotation of said element but not preventing movement of the element and pin in the slot, and means for detachably securing the element to the pin so as to prevent rotation of the latter.

10. In braking apparatus, a support provided with a slot, a brake drum, two brake shoes for cooperation with the drum and having overlapping ends each of which has a bearing opening, a pin extending through the slot and the openings, two bearings carried by the pin and each cooperating with a shoe opening, one of said bearings having its axis eccentric to the axis of the pin, an element loosely mounted on said pin and positioned in the slot, cooperating means between the element and slot for preventing rotation of said element but not preventing movement of the element and pin in the slot, means for detachably securing the element to the pin so as to prevent rotation of the latter, and means for establishing a friction resistance to movement of the pin and element in the slot.

11. In braking apparatus, a support provided with a slot, a brake drum, two brake shoes for cooperation with the drum having overlapping ends, each of which is provided with a bearing opening, a pin extending through the slot and the openings, two bearings carried by the pin and each cooperating with an opening, one of said bearings being eccentric to the axis of the pin and rotatable therewith and the other concentric and mounted to permit relative rotation of the pin, an extension on the concentric bearing provided with flats cooperating with the slot for preventing rotation of the said bearing, releasable means for clamping said concentric bearing to the pin, and spring means for biasing one of said bearings against the support.

12. In braking apparatus provided with two shoes having overlapping ends each of which has a bearing opening, spaced supports receiving the overlapping ends therebetween, said supports being provided with parallel slots, a pin positioned in the slots and the openings of the shoes, an eccentric bearing member on the pin for the opening in one shoe, a second bearing member on the pin for the opening in the other shoe and provided with a portion having flats cooperating with one slot, said pin being capable of relative rotation with said second bearing, a nut for clamping the pin and the second bearing member together, and a sleeve mounted on the pin and having flats cooperating with the other slot.

13. In braking apparatus provided with two shoes having overlapping ends each of which has a bearing opening, spaced supports receiving the overlapping ends therebetween, said supports being provided with parallel slots, a pin positioned in the slots and the openings of the shoes, an eccentric bearing member on the pin for the opening in one shoe, a second bearing member on the pin for the opening in the other shoe and provided with a portion having flats cooperating with one slot, said pin being capable of relative rotation with said second bearing, a nut for clamping the pin and the second bearing member together, a sleeve mounted on the pin and having flats cooperating with the other slot, and spring means for biasing the eccentric bearing member against the adjacent support.

14. In braking apparatus provided with a backing plate and with two shoes having overlapping ends each of which has a bearing opening, a U-shaped member mounted on the plate and receiving the overlapping ends, the legs of said U-shaped member being provided with parallel slots, a pin positioned in the slots and the openings of the shoes, an eccentric bearing member on the pin for the opening in one shoe, a second bearing member on the pin for the opening in the other shoe and provided with a portion having flats cooperating with one slot, said pin being capable of relative rotation with said second bearing, a nut for clamping the pin to the second bearing member, a sleeve mounted on the pin and having flats cooperating with the other slot, and a leaf spring cooperating with the pin and one leg of the U-shaped member for causing the eccentric bearing to frictionally engage a surface of said U-shaped member.

BURNS DICK.